(12) United States Patent
Hatta (10) Patent No.: US 11,597,170 B2
(45) Date of Patent: Mar. 7, 2023

(54) METHOD FOR MANUFACTURING FIBER REINFORCED RESIN MOLDED ARTICLE, AND MANUFACTURING DEVICE THEREOF

(71) Applicant: TOYOTA JIDOSHA KABUSHIKI KAISHA, Toyota (JP)

(72) Inventor: Ken Hatta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 17/114,571

(22) Filed: Dec. 8, 2020

(65) Prior Publication Data

US 2021/0221075 A1 Jul. 22, 2021

(30) Foreign Application Priority Data

Jan. 21, 2020 (JP) .............................. JP2020-007382

(51) Int. Cl.
*B29C 70/48* (2006.01)
*B29C 70/54* (2006.01)

(52) U.S. Cl.
CPC .............. *B29C 70/48* (2013.01); *B29C 70/54* (2013.01)

(58) Field of Classification Search
CPC .................................................. B29C 45/561
See application file for complete search history.

(56) References Cited

U.S. PATENT DOCUMENTS

| 3,028,284 A | * | 4/1962 | Reeves | ................... | B29C 70/48 |
| | | | | | 156/215 |
| 2019/0084249 A1 | | 3/2019 | Hatta | | |

FOREIGN PATENT DOCUMENTS

| EP | 3124220 A1 | 2/2017 |
| JP | H09225956 A | 9/1997 |
| JP | 2014156115 A | 8/2014 |
| JP | 2019056415 A | 4/2019 |
| JP | 2019142094 A | 8/2019 |
| JP | 2019142118 A | 8/2019 |
| WO | 00/54951 A1 | 9/2000 |

OTHER PUBLICATIONS

Indian Office Action dated Aug. 25, 2021, which issued in the corresponding Indian Patent Application No. 202014054035, including English translation.

* cited by examiner

*Primary Examiner* — Christopher T Schatz
(74) *Attorney, Agent, or Firm* — Dickinson Wright, PLLC (57) ABSTRACT

Provided is a method for manufacturing a fiber reinforced resin molded article capable of distributing the pressure without concentration on the vicinity of the resin inlet and so preventing the deformation of a preform, and such a manufacturing device thereof. The method lowers a lower core as a moving core in a lower mold (first mold) (away from a preform) to let resin flow toward the lower mold (first mold). This distributes the pressure concentrated in the vicinity of the resin inlet and prevents deformation of the preform.

5 Claims, 7 Drawing Sheets

METHOD FOR MANUFACTURING FIBER REINFORCED RESIN MOLDED ARTICLE, AND MANUFACTURING DEVICE THEREOF

CROSS REFERENCE TO RELATED APPLICATIONS

The present application claims priority from Japanese patent application JP 2020-007382 filed on Jan. 21, 2020, the entire content of which is hereby incorporated by reference into this application.

BACKGROUND

Technical Field

The present disclosure relates to methods for manufacturing fiber reinforced resin molded articles, such as a high-pressure tank that is reinforced with fibers, and manufacturing devices thereof.

Background Art

Fuel cell vehicles include a high-pressure tank (hereinafter, simply may be called a tank) that stores fuel gas such as natural gas or hydrogen gas. Such a high-pressure tank is prepared as a fiber reinforced resin molded article that includes a hollow liner having a gas barrier property as a core member, and carbon fiber reinforced plastic or glass fiber reinforced plastic (hereinafter collectively called a fiber reinforced resin layer) that coats the liner. For lightweight, a hollow container made of resin is typically used as the liner.

High-pressure tanks have been conventionally manufactured by the filament winding (FW) method and the resin transfer molding (RTM) method. JP 2019-056415 A, for example, discloses a method for manufacturing a high-pressure tank by the RTM method. This manufacturing method places a preform in a mold, the preform including a liner defining the inner space of the high-pressure tank and a fiber layer formed on the outer surface of the liner, and rotates the preform in the circumferential direction about the central axis of the preform in the mold while injecting resin from a gate toward the preform placed in the mold.

SUMMARY

In the manufacturing method by the RTM method, resin may be injected (poured) at high pressure in order to impregnate the inner part of the resin layer (bundle) of the preform with the resin. When the resin is injected at high pressure, the pressure tends to concentrate on the gate (hereinafter this may be called a resin inlet), so that a pressure difference between the vicinity of the gate (resin inlet) and the flow end of the resin becomes large, and the preform may be deformed at a high-pressure area.

In view of the above problems, the present disclosure provides a method for manufacturing a fiber reinforced resin molded article capable of distributing the pressure without concentration on the vicinity of the resin inlet and so preventing the deformation of a preform, and such a manufacturing device thereof.

According to one aspect of the present disclosure, a method for manufacturing a fiber reinforced resin molded article to form a preform including a fiber layer on an outer surface of a liner, impregnate the fiber layer of the preform with resin, and cure the resin, and the method includes: a step of preparing a mold including a first mold and a second mold; a step of placing the preform between the first mold and the second mold so as to define a first gap between the first mold and the preform and a second gap between the second mold and the preform, the second gap being larger than the first gap; a step of pouring the resin from a resin inlet toward the second gap in the mold; a step of separating at least a part of the first mold facing the preform from the preform to define a third gap between the at least a part of the first mold and the preform, the third gap being larger than the first gap, to charge the resin, which was poured toward the second gap in the mold, into between the first mold and the preform; and a step of bringing the second mold and the at least a part of the first mold together close to the preform for compressive filling with the resin in the mold.

According to another aspect of the present disclosure, a method for manufacturing a fiber reinforced resin molded article to form a preform including a fiber layer on an outer surface of a liner, impregnate the fiber layer of the preform with resin, and cure the resin, and the method includes: a step of preparing a mold including a first mold and a second mold, the first mold having a moving core that is disposed to face the preform and moves relative to the preform so as to increase and decrease a gap defined between the moving core and the preform; a step of placing the preform between the first mold and the second mold so as to define a first gap between the first mold and the preform and a second gap between the second mold and the preform, the second gap being larger than the first gap; a step of pouring the resin from a resin inlet toward the second gap in the mold; a step of separating the moving core from the preform to define a third gap between the moving core and the preform, the third gap being larger than the first gap, to charge the resin, which was poured toward the second gap in the mold, into between the first mold and the preform; and a step of bringing the second mold and the moving core together close to the preform for compressive filling with the resin in the mold.

In some embodiments, in the step of separating the moving core from the preform to charge the resin, which was poured toward the second gap in the mold, into between the first mold and the preform, the second mold is brought close to the preform.

In some embodiments, in the step of separating the moving core from the preform to charge the resin, which was poured toward the second gap in the mold, into between the first mold and the preform, the moving core is separated from the preform while detecting a pressure of the resin poured between the second mold and the preform.

In some embodiments, in the step of bringing the second mold and the moving core together close to the preform for compressive filling with the resin in the mold, the second mold and the moving core are brought together to the preform so that a pressure of the resin poured between the moving core and the preform agrees with a pressure of the resin poured between the second mold and the preform.

According to another aspect of the present disclosure, a device is for manufacturing a fiber reinforced resin molded article to form a preform including a fiber layer on an outer surface of a liner, impregnate the fiber layer of the preform with resin, and cure the resin, and the device includes: a mold including a first mold and a second mold; a driving mechanism configured to drive the mold in an opening direction and a closing direction; a resin pouring mechanism configured to pour the resin from a resin inlet into the mold; and a control device configured to control operating states of the driving mechanism and the resin pouring mechanism. The control device is configured to control the driving mechanism to place the preform between the first mold and the second mold so as to define a first gap between the first mold and the preform and a second gap between the second mold and the preform, the second gap being larger than the first gap; control the resin pouring mechanism to pour the resin from the resin inlet toward the second gap in the mold; control the driving mechanism to separate at least a part of the first mold facing the preform from the preform to define a third gap between the at least a part of the first mold and the preform, the third gap being larger than the first gap, to charge the resin, which was poured toward the second gap in the mold, into between the first mold and the preform; and control the driving mechanism to bring the second mold and the at least a part of the first mold together close to the preform for compressive filling with the resin in the mold.

According to another aspect of the present disclosure, a device is for manufacturing a fiber reinforced resin molded article to form a preform including a fiber layer on an outer surface of a liner, impregnate the fiber layer of the preform with resin, and cure the resin, and the device includes: a mold including a first mold and a second mold, the first mold having a moving core that is disposed to face the preform and moves relative to the preform so as to increase and decrease a gap defined between the moving core and the preform; a driving mechanism configured to drive the mold in an opening direction and a closing direction; a resin pouring mechanism configured to pour the resin from a resin inlet into the mold; and a control device configured to control operating states of the driving mechanism and the resin pouring mechanism. The control device is configured to control the driving mechanism to place the preform between the first mold and the second mold so as to define a first gap between the first mold and the preform and a second gap between the second mold and the preform, the second gap being larger than the first gap; control the resin pouring mechanism to pour the resin from the resin inlet toward the second gap in the mold; control the driving mechanism to separate the moving core from the preform to define a third gap between the moving core and the preform, the third gap being larger than the first gap, to charge the resin, which was poured toward the second gap in the mold, into between the first mold and the preform; and control the driving mechanism to bring the second mold and the moving core together close to the preform for compressive filling with the resin in the mold.

In some embodiments, the control device is configured to, when separating the moving core from the preform to charge the resin, which was poured toward the second gap in the mold, into between the first mold and the preform, control the driving mechanism to bring the second mold close to the preform.

In some embodiments, the device further includes a pressure sensor configured to detect a pressure of the resin poured between the second mold and the preform. The control device is configured to, when separating the moving core from the preform to charge the resin, which was poured toward the second gap in the mold, into between the first mold and the preform, control the driving mechanism to separate the moving core from the preform while detecting a pressure of the resin with the pressure sensor.

In some embodiments, the device further includes: a first pressure sensor configured to detect a pressure of the resin poured between the moving core and the preform; and a second pressure sensor configured to detect a pressure of the resin poured between the second mold and the preform. The control device is configured to, when bringing the second mold and the moving core together close to the preform for compressive filling with the resin in the mold, control the driving mechanism to bring the second mold and the moving core together to the preform so that a pressure of the resin detected by the first pressure sensor agrees with a pressure of the resin detected by the second pressure sensor.

According to one aspect of the present disclosure, at least a part of a first mold or a moving core in the first mold is separated from the preform to let the resin flow toward the first mold. This distributes the pressure concentrated on the vicinity of the resin inlet, and so prevents deformation of the preform.

DETAILED DESCRIPTION

The following describes one embodiment of the present disclosure, with reference to the attached drawings.

The following describes a high-pressure tank for fuel cell vehicle that is one example of a fiber reinforced resin molded article. The fiber reinforced resin molded article, to which the present disclosure is applied, is not limited to the high-pressure tank for fuel cell vehicles. The shape, the material, etc. of the liner and the preform of the fiber reinforced resin molded article are also not limited to the illustrated example.

The RTM method wraps (winds) carbon fiber around a liner multiple times (in multiple layers) to form a preform with a fiber layer on the outer surface of the liner, impregnates the fiber layer of the preform with epoxy resin, and cures the epoxy resin. In this way, the RTM method manufactures a high-pressure tank for fuel cell vehicle including a fiber reinforced resin layer including the carbon fiber and the epoxy resin on the outer periphery of the liner. The liner is a hollow container made of resin (for example, nylon resin) that defines the inner space of the high-pressure tank.

In such a high-pressure tank for fuel cell vehicle, the carbon fiber is laminated thickly, and so the resin hardly enters into the inner layer of the carbon fiber. That is, the high-pressure tank for fuel cell vehicle has the carbon fiber that is laminated very thickly (about 10 times that of a typical RTM molded body part) to keep enough strength, and it is difficult to impregnate the fiber with resin. Simple tank rotation as in JP 2019-056415 A does not exert a good effect of resin impregnation into the inner layer of the carbon fiber. When resin is poured at high pressure for resin impregnation into the inner layer of the carbon fiber, the pressure does not distribute uniformly, so that the quality and performance of the tank will deteriorate, such as deformation of the resin liner inside of the tank at a partially high-pressure part. The pressure tends to concentrate on the gate (resin inlet), for example. This means that the pressure is high near the gate and so a pressure difference increase between the vicinity of the gate and the flow end of the resin (on the opposite side of the gate).

The gap between the mold and the tank is narrow and the tank has a cylindrical shape, and so it is difficult for the resin to flow to the side opposite of the gate. It is therefore hard to uniformly fill the entire gap with resin, making the resin impregnation ununiform. In order to let the resin flow through the entire gap before curing, the tank needs to be rotated at a high speed in the mold, for example. However, the space is small, and so the carbon fiber may be damaged.

To avoid this, the present embodiment has the following configuration.

[Manufacturing Device of High-Pressure Tank]

Figure 1:
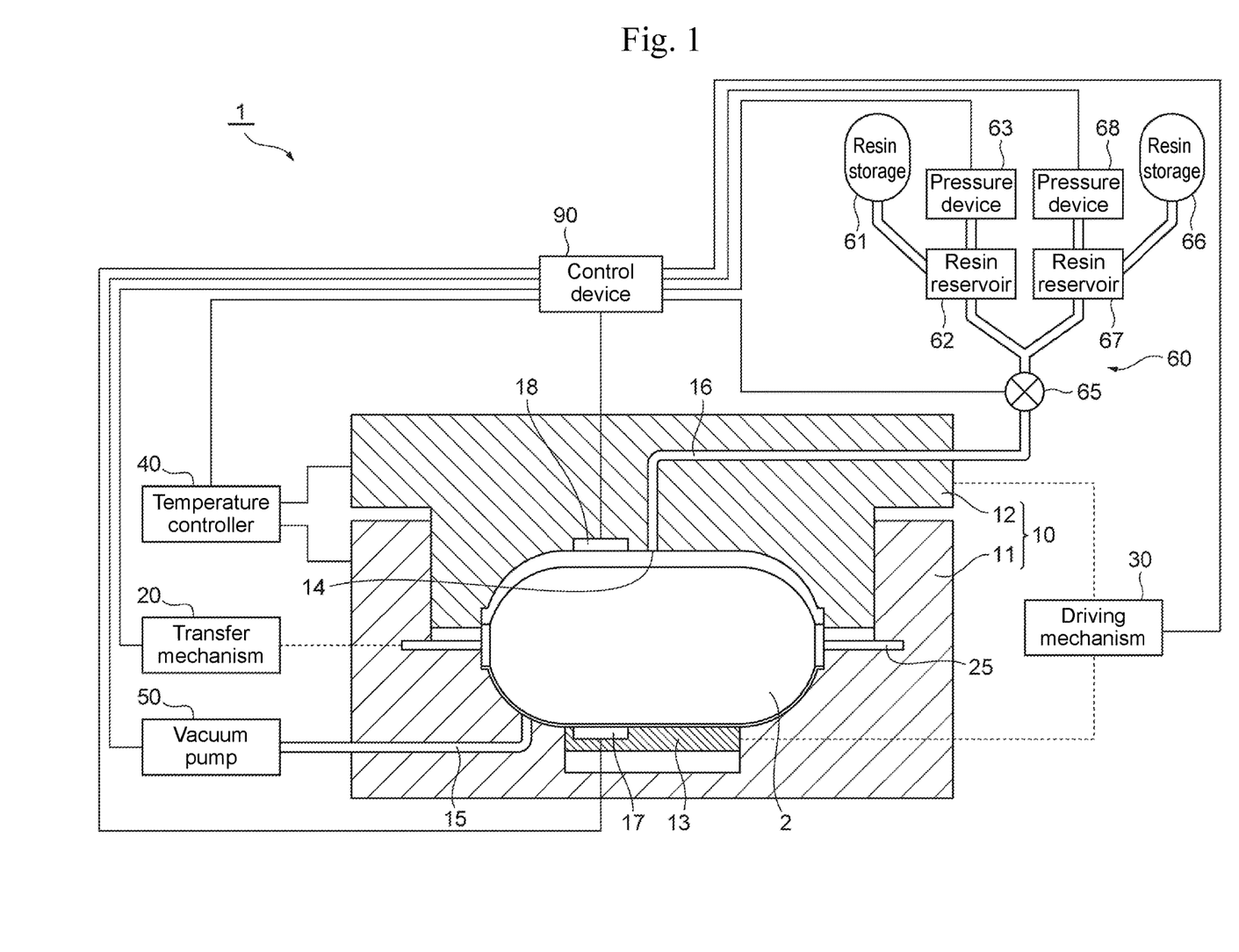
FIG. 1 is a vertical cross-sectional view of a manufacturing device of a high-pressure tank (fiber reinforced resin molded article) according to one embodiment.

FIG. 1 is a vertical cross-sectional view showing a manufacturing device of a high-pressure tank that is an example of a fiber reinforced resin molded article according to this embodiment.

A preform 2 as an intermediate body of the high-pressure tank to be manufactured in the present embodiment includes a liner and a fiber layer formed on the outer surface of the liner to be integrated with the liner. The liner is a resin hollow container having a gas barrier property and defining an inner space of the high-pressure tank. In one example, the fiber layer has a thickness of about 10 mm to 30 mm. The fiber layer is formed by wrapping fibers around the outer surface of the liner multiple times by the filament winding method.

Examples of the fiber wound around the liner include carbon fiber, glass fiber, and aramid fiber. The fibers may include continuous fibers, or include long fibers or short fibers. As described later, the fiber (layer) wound around the liner is impregnated with resin and cured to form a fiber reinforced resin layer that coats the periphery of the liner. Examples of the resin include thermosetting resins, such as epoxy resins, unsaturated polyester resins, and polyamide resins, and thermoplastic resins, such as polyethylene resins and polyester resins.

Figure 4:
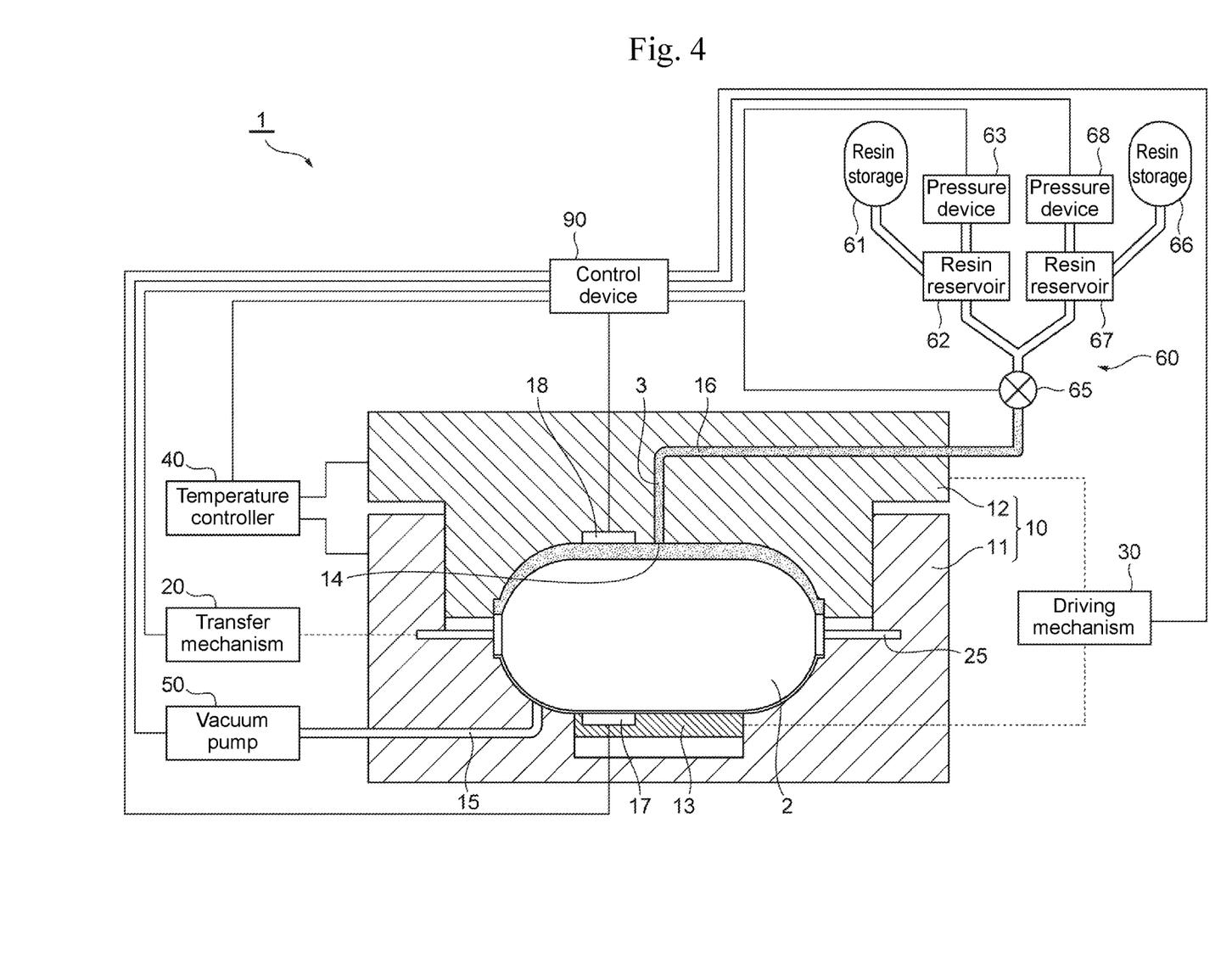
FIG. 4 is a vertical cross-sectional view of the manufacturing device of a high-pressure tank, showing a resin pouring step while temporary-tightening the mold according to one embodiment.

The manufacturing device 1 is configured to manufacture a high-pressure tank by the RTM method to impregnate the fiber layer making up the preform 2 with resin 3 (reference numeral is shown in FIG. 4, for example) and cure the impregnated resin 3.

In one example, the manufacturing device 1 includes a mold 10 made up a plurality of molds, such as a lower mold 11 as a fixed mold and an upper mold 12 as a moving mold. Closing of these lower mold 11 and upper mold 12 (this may be called mold clamping) defines a cavity for the fiber reinforced resin layer. To place the preform 2 having the lamination of fiber in the mold 10, the cavity of the mold 10 is made larger by the tolerance of the preform 2, for example.

This embodiment includes the lower mold 11 as a fixed mold and the upper mold 12 as a moving mold (a mold that is movable relative to the fixed mold). In another embodiment, the upper mold 12 may be a fixed mold and the lower mold 11 may be a moving mold, or both of the lower mold 11 and the upper mold 12 may be movable. The mold 10 in this embodiment includes two parts of the lower mold 11 and the upper mold 12, which may be three or more of parts.

In this example, a lower core 13 is disposed at a position facing the preform 2 in the lower mold 11. This lower core 13 defines a part of the cavity, and is a moving core that moves (vertically) relative to the preform 2 placed in the mold 10. That is, the lower core 13 is placed to face the preform 2 in the mold 10, and the face (upper face) of the lower core 13 facing the preform 2 is a cavity face that defines the cavity together with the (cavity face of) lower mold 11. The movement of this lower core 13 relative to the preform 2 (vertically) increases or decreases the gap formed between the lower core 13 and the preform 2. In the illustrated example, the lower core 13 is disposed to face a central portion of the lower face of the preform 2. The position of the lower core 13 is not limited to this, and in some embodiments, the lower core 13 may be placed so as to face the entire lower face of the preform 2.

In the mold 10, the preform 2 is supported by a shaft 25 that is disposed along the axis of the liner. That is, the shaft 25 constitutes a support mechanism that supports the preform 2 in the mold 10 (in the cavity).

A vacuum degassing pipe 15 is embedded in the mold 10 (in the lower mold 11 in the illustrated example). The vacuum degassing pipe 15 connects to a vacuum pump 50. The vacuum pump 50 operates to degas (evacuate) the mold 10 (the cavity) via the vacuum degassing pipe 15. That is, the vacuum pump 50 and the vacuum degassing pipe 15 constitute a vacuum degassing mechanism for vacuum degas of the mold 10 (the cavity).

In the mold 10 (in the upper mold 12 in the illustrated example), a resin pouring pipe 16 is embedded, which defines a gate (resin inlet) 14 that opens to the cavity. In this example, the gate 14 is at a position facing a central portion (in the axial direction) of the preform 2. The resin pouring pipe 16 connects to a resin injector 60. The resin injector 60 pours (supplies) resin 3 into the mold 10 (cavity) via the gate 14 through the resin pouring pipe 16. That is, the resin injector 60 and the resin pouring pipe 16 constitute a resin pouring mechanism for pouring of the resin 3 into the mold 10 (the cavity). In one example, the resin 3 is a two-component thermosetting epoxy resin composed of a base resin and a curing agent. The resin injector 60 therefore includes a resin storage 61, a resin reservoir 62, and a pressure device 63 for the base resin, a resin storage 66, a resin reservoir 67, and a pressure device 68 for the curing agent, and a valve 65 to supply the resin 3, which is a mixture of the base resin and the curing agent, to the resin pouring pipe 16.

In this example, a pressure sensor (first pressure sensor) 17 is embedded in the (the lower core 13 of) lower mold 11. The pressure sensor 17 detects a pressure of the resin 3 on the lower face of the preform 2, i.e., between the lower face of the preform 2 and the (lower core 13 of) lower mold 11. A pressure sensor (second pressure sensor) 18 is embedded in the upper mold 12. The pressure sensor 18 detects a pressure of the resin 3 on the upper face of the preform 2, i.e., between the upper face of the preform 2 and the upper mold 12. The pressure information (resin pressure) obtained by the pressure sensors 17 and 18 is input to a control device 90 described later.

The manufacturing device 1 includes: a transfer mechanism 20 to transfer the preform 2 to a predetermined position; a driving mechanism 30 to drive the mold 10

(specifically, the lower core 13 of the lower mold 11 and the upper mold 12) in the direction to open and close the mold (vertical direction); a temperature controller 40 to control the temperature of the mold 10 (lower mold 11, upper mold 12); and a control device 90 as a controller to control the operating state of the entire manufacturing device 1 (specifically, the operating state of the transport mechanism 20, the driving mechanism 30, the temperature controller 40, the vacuum pump 50 in the vacuum degassing mechanism, and the pressure devices 63 and 68 and the valve 65 of the resin injector 60 in the resin pouring mechanism).

[Method for Manufacturing a High-Pressure Tank]

Figure 2:
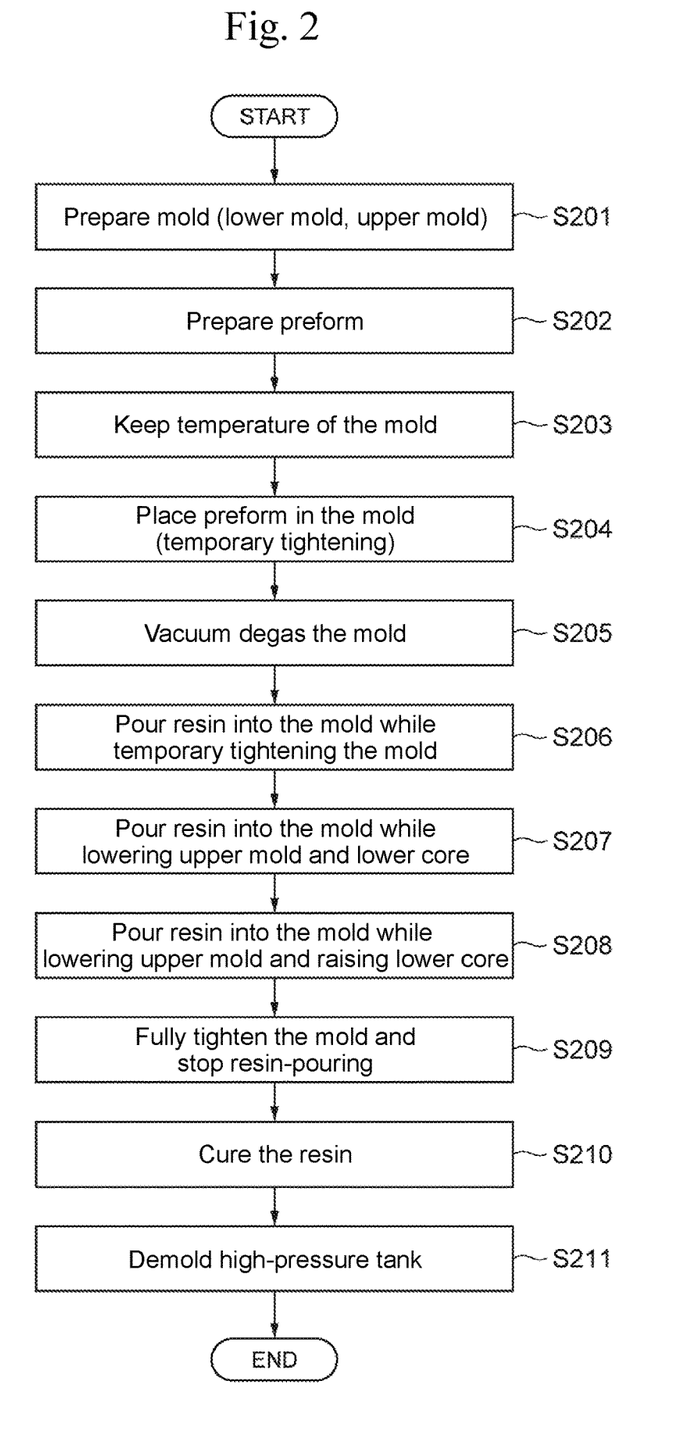
FIG. 2 is a flowchart of the method for manufacturing a high-pressure tank (fiber reinforced resin molded article) according to one embodiment.

FIG. 2 is a flowchart illustrating a method for manufacturing a high-pressure tank as an example of the fiber reinforced resin molded article according to one embodiment. FIGS. 3 to 7 are vertical cross-sectional views showing a preform placing step, a vacuum degassing step, a resin pouring step while temporarily tightening the mold, a resin pouring step while lowering the upper mold and the lower core, a resin pouring step while lowering the upper mold and raising the lower core, a fully tightening and resin-pouring stop step, and a resin curing step.

(Mold Preparation Step: S201)

Firstly, the method prepares the mold 10 including the lower mold 11 having the lower core 13 and the upper mold 12 having the above-described structure.

(Preform Preparation Step: S202)

As described above, the method prepares the preform 2 beforehand, in which a fiber layer is formed by wrapping (winding) fiber around the outer surface of the liner.

(Mold Temperature-Retention Step: S203)

Next, the method makes the control device 90 to control the temperature controller 40 so as to keep the temperature of the mold 10 (lower mold 11, upper mold 12) to a predetermined temperature. When the resin 3 is a thermosetting resin, this predetermined temperature is equal to or higher than the curing temperature of the resin 3.

The method in this example keeps the temperature of the mold 10 to be the curing temperature of the resin 3 or higher at the beginning. In another example, the temperature of the mold 10 may be kept to be less than the curing temperature of the resin 3 at the beginning, and at an appropriate timing in a step described later (e.g., after fully tightening of the mold 10), the temperature of the mold 10 may be kept to be the curing temperature or higher of the resin 3.

(Preform Placing Step: S204)

Figure 3:
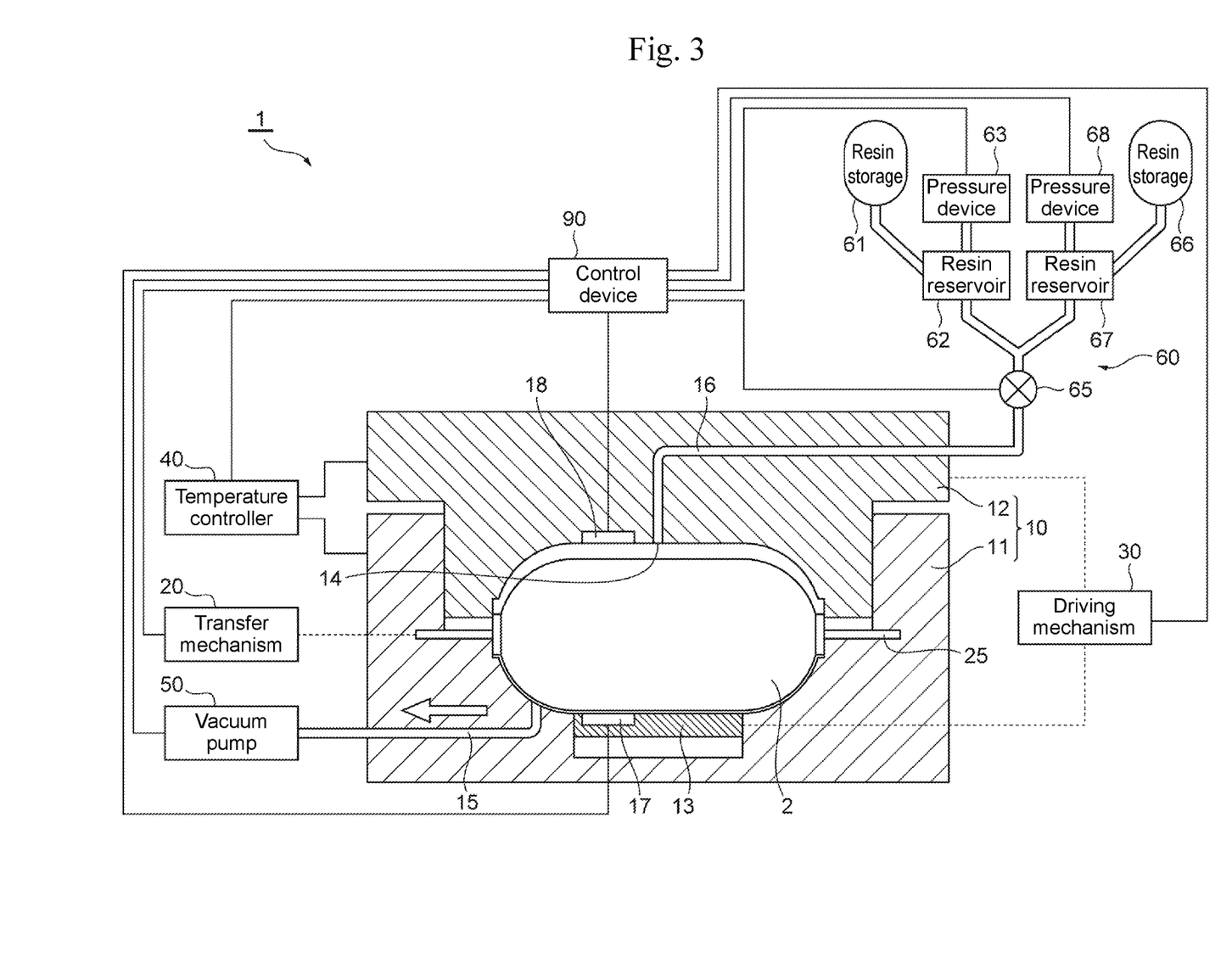
FIG. 3 is a vertical cross-sectional view of the manufacturing device of a high-pressure tank, showing a preform placing step and a vacuum degassing step according to one embodiment.

Subsequently, the control device 90 controls the transfer mechanism 20 and the driving mechanism 30 to place the preform 2 in the mold 10 (that is, between the lower mold 11 and the upper mold 12) (FIG. 1, FIG. 3). Specifically, while opening the upper mold 12, the transfer mechanism 20 places the preform 2 on the lower mold 11 under the control of the control device 90. At this time, the shaft 25 supports the preform 2. After that, the drive mechanism 30 starts mold clamping under the control of the control device 90 and temporarily tightens the upper mold 12. Temporary tightening is an intermediate state between the state where the upper mold 12 is open and the fully tightening state, and the lower mold 11 and the upper mold 12 has a gap therebetween in the temporary tightening state. As shown in FIG. 3, the upper mold 12 moves to a position having a gap (second gap) of several mm with the preform 2. This gap (second gap) between the upper mold 12 and the preform 2 is larger than a gap (first gap) between the lower mold 11 and the preform 2.

(Vacuum Degassing Step: S205)

Next, the control device 90 controls the vacuum pump 50 while keeping the above-mentioned temporary tightening state (i.e., before completion of mold clamping) to degas the mold 10 (FIG. 3).

(Resin Pouring Step while Temporary-Tightening the Mold: S206)

After stopping (or completion of) the above-stated vacuum degassing, the resin 3 is injected/poured into the mold 10 (FIG. 4). Specifically, the control device 90 opens the valve 65, pressurizes the base resin stored in the resin reservoir 62 with the pressure device 63, and pressurizes the curing agent stored in the resin reservoir 67 with the pressure device 68 to mix the base resin and the curing agent and prepare (uncured) resin 3. This lets the (uncured) resin 3 flow through the resin pouring pipe 16 in the upper mold 12, so that the resin 3 is injected/poured toward the preform 2 via the gate 14 (in the illustrated example, the gate at a center of the preform 2). Since the upper mold 12 is temporarily tightened, the resin 3 is injected and poured into the gap (second gap) between the upper mold 12 and the (upper face of) preform 2.

(Resin Pouring Step while Lowering the Upper Mold and the Lower Core: S207)

Figure 5:
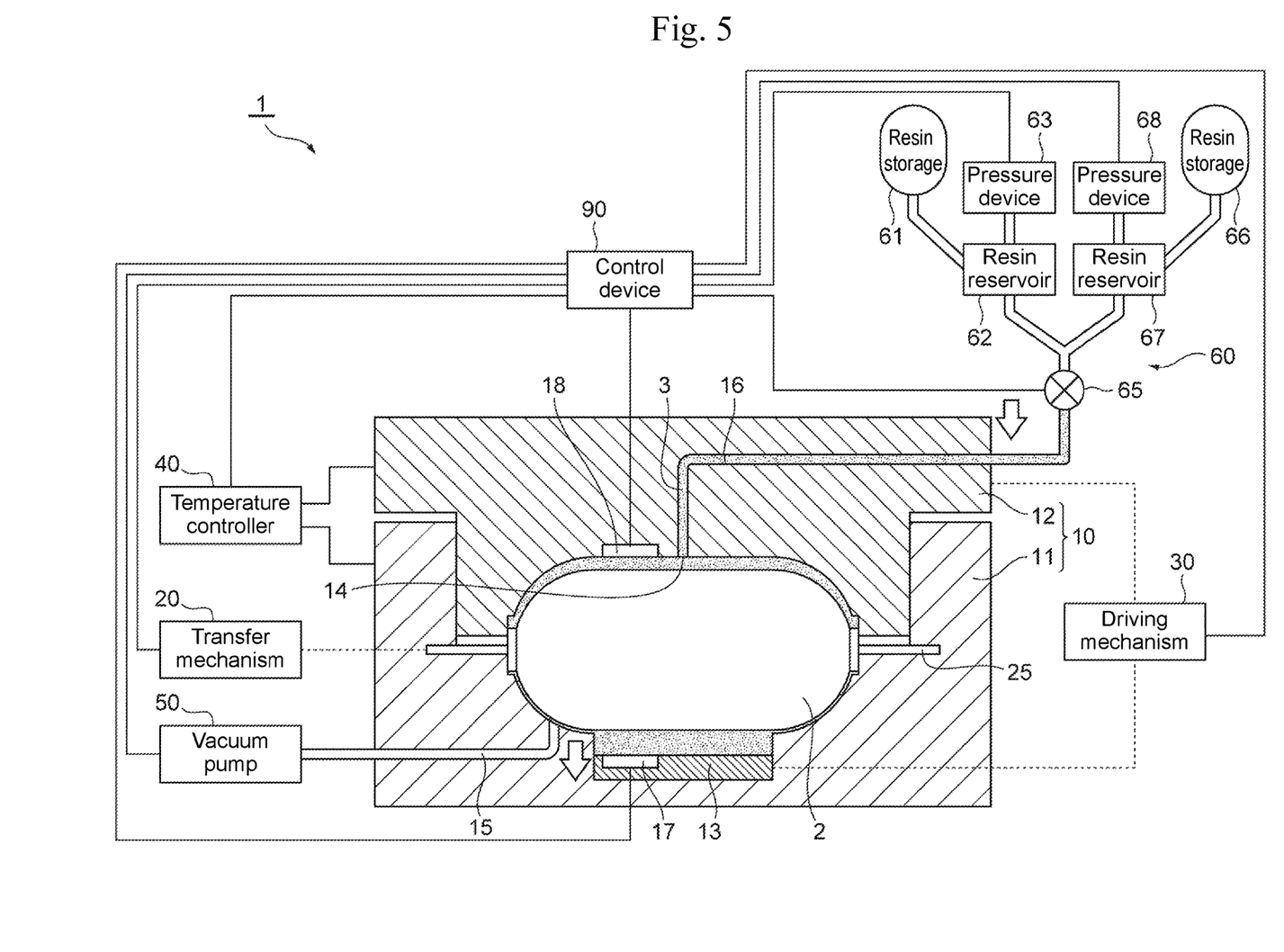
FIG. 5 is a vertical cross-sectional view of the manufacturing device of a high-pressure tank, showing a resin pouring step while lowering the upper mold and the lower core according to one embodiment.

Subsequently, the control device 90 controls the driving mechanism 30 to lower the lower core 13 in the lower mold 11 (that is, separate the lower core 13 away from the preform 2) while closing the upper mold 12 (injection compression) (FIG. 5). This increases the gap (third gap) between the lower core 13 and the preform 2 (i.e., defines the third gap between the lower core 13 and the preform 2 that is of several mm and is larger than the first gap) so as to impregnate the preform 2 with the resin from the upper face of the preform 2 and uniformly fill also the gap between the lower mold 11 (especially the lower core 13) and the (lower face of) the preform 2 with the resin 3. At this time, the control device 90 lowers the lower core 13 while detecting the pressure of the resin 3 on the upper face of the preform 2 (that is, the resin poured between the upper mold 12 and the preform 2) with the pressure sensor 18. This is to reduce the pressure of the resin 3 on the upper face of the preform 2 and to let the resin 3 uniformly flow toward the lower face of the preform 2 as well. In one example, the control device 90 can control the descending speed of the upper mold 12 and the lower core 13 based on the detected pressure (resin pressure) by the pressure sensor 18.

(Resin Pouring Step while Lowering the Upper Mold and Raising the Lower Core: S208)

Figure 6:
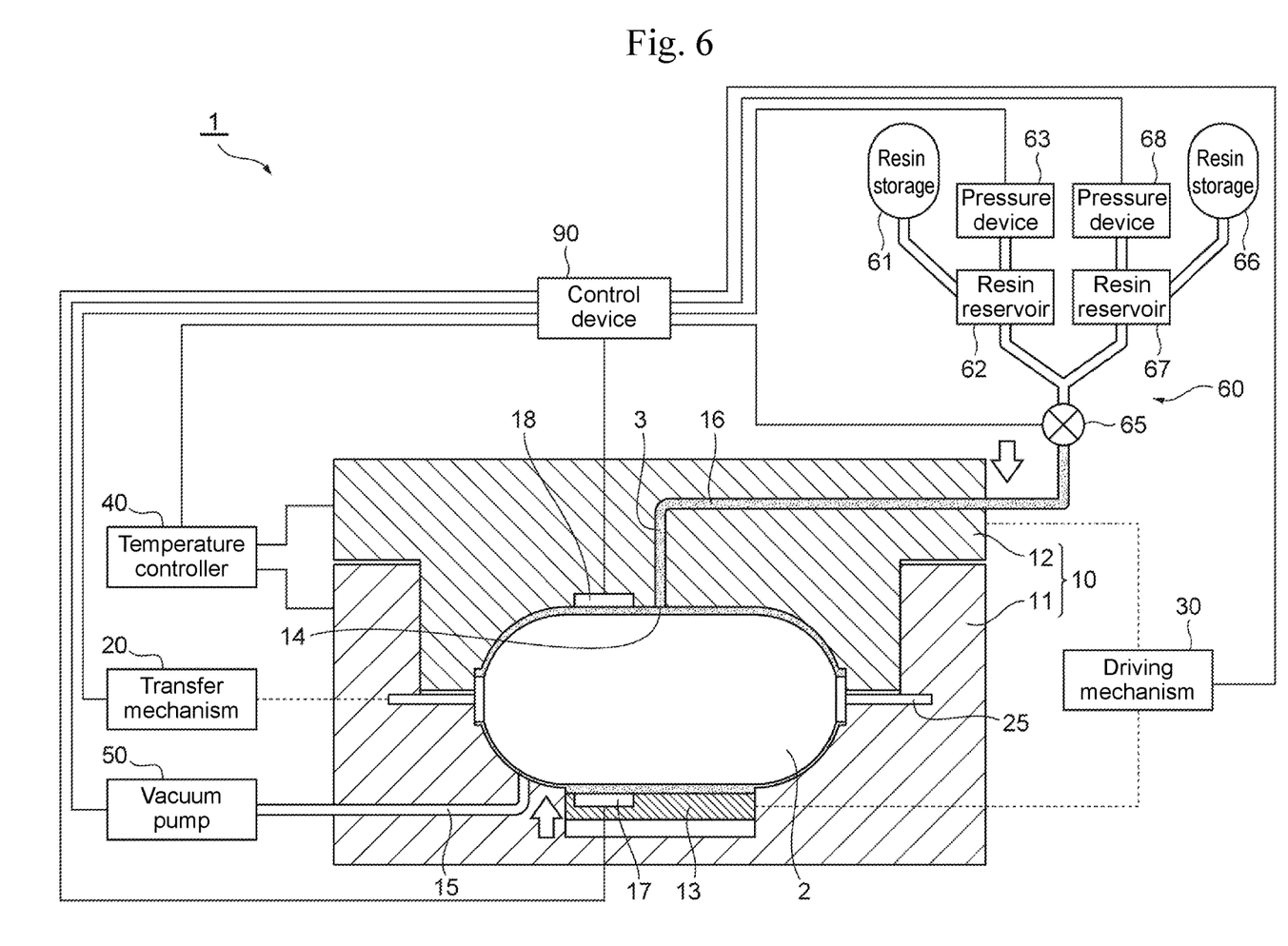
FIG. 6 is a vertical cross-sectional view of the manufacturing device of a high-pressure tank, showing a resin pouring step while lowering the upper mold and raising the lower core according to one embodiment.

Subsequently, the control device 90 controls the driving mechanism 30 to lower the upper mold 12 to the lower end to close the mold while raising the lower core 13 in the lower mold 11 (i.e., bringing it closer to the preform 2) (to the original position to be flush with the cavity face of the lower mold 11) (FIG. 6). At this time, while the pressure sensor 18 detects the pressure of the resin 3 on the upper face of the preform 2, the pressure sensor 17 detects the pressure of the resin 3 on the lower face of the preform 2. Then, the control device 90 controls to lower the upper mold 12 and raise the lower core 13 (i.e., bring both of the upper mold 12 and the lower core 13 closer to the preform 2) so that the values of the pressure of the resin 3 detected by the pressure sensors 18 and 17 agree with each other. As a result, the resin 3 in the mold 10 is uniformly compressed and charged, so that the fiber layer of the preform 2 is impregnated with the resin 3. In one example, when closing (simultaneously) both of the upper mold 12 and the lower core 13 to bring them closer to the preform 2, the control device 90 can control the descending speed of the upper mold 12 and the ascending speed of the lower core 13 based on the pressure (resin pressure) detected by the pressure sensors 18 and 17.

(Fully Tightening and Resin-Pouring Stop Step: S209)

After the filling with the resin 3 ends, the control device 90 controls the driving mechanism 30 to completely close (fully tightening) the upper mold 12 and the lower core 13 in the lower mold 11. Then, after the fiber layer is completely impregnated with the resin 3, the pouring of the resin 3 stops (FIG. 7).

(Resin Curing Step: S210)

Figure 7:
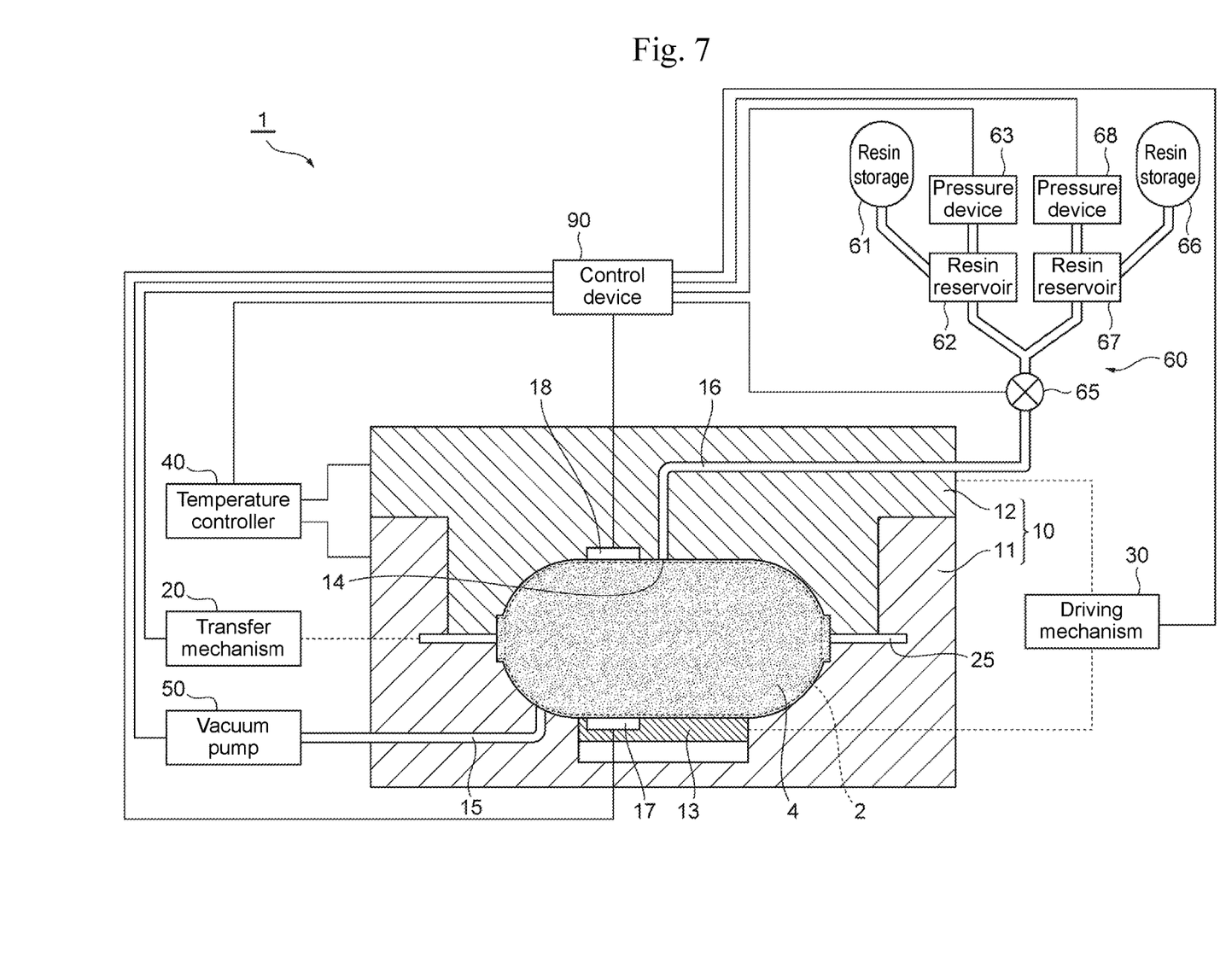
FIG. 7 is a vertical cross-sectional view of the manufacturing device of a high-pressure tank, showing a fully tightening and resin-pouring stop step as well as a resin curing step according to one embodiment.

After the pouring of the resin 3 stops as stated above, the method cures the resin 3 (FIG. 7).

(Demolding Step: S211)

After the resin 3 is cured, the control device 90 controls the driving mechanism 30 to open the upper mold 12. When the curing of the resin 3 ends, a high-pressure tank 4 having the fiber reinforced resin layer formed on the outer periphery of the liner is obtained.

As described above, when a high-pressure tank for fuel cell vehicle is manufactured by the RTM impregnation technology, it is difficult to apply the resin pressure evenly over the large tank having the carbon fiber (fiber layer) thickly stacked on (wound around) the tank for filling and impregnation with epoxy resin and curing of the epoxy resin. Additionally, the tank has a thick layer of carbon fibers, and so unless the resin is filled at a high pressure, the innermost layer cannot be impregnated with the resin. The pressure immediately below the gate (resin inlet), for example, therefore is too high, and critical quality problems will occur, such as deformation of the resin liner inside the tank and fiber displacement, which will degrade the productivity and the tank performance.

In order to avoid pressure concentration on the gate 14 and to uniformly impregnate the thick carbon fiber laminated portion with the resin 3, in other words, in order to distribute the pressure applied to the gate 14 during resin injection, and apply low resin pressure to the entire tank uniformly, the present embodiment includes the lower core 13 in the lower mold 11 of the mold 10, the lower core 13 being a moving core that is vertically movable, and the pressure sensors 18 and 17 in the upper mold 12 and the lower mold 11 to detect the resin pressure. When placing the tank (preform 2) in the mold 10 and clamping the mold, a gap is kept between the upper mold 12 and the lower mold 11 to define a gap between the upper mold 12 and the tank (preform 2). This reduces the resin flow resistance during epoxy resin injection and moderates a pressure surge. Additionally, in order to make the pressure over the entire tank uniform and low to impregnate the laminated layer with the resin 3, when the upper mold 12 is closed (injection compression) to impregnate the upper face of the tank with the resin 3, the nested lower core 13 is lowered while detecting a pressure on the upper face of the tank to reduce the pressure on the upper face of the tank so as to form a gap between the lower mold 11 and the tank (the gap as a resin flow channel). This allows the resin 3 to flow evenly on the lower face of the tank as well, and achieves a decrease in the pressure and uniform impregnation with the resin.

This distributes the pressure applied to the gate 14 during resin pouring, and also enables uniform pressure applied to the entire tank. This also improves the resin impregnation in the stacking direction while optimizing the flow behavior in the mold 10. It is also possible to impregnate there with the resin 3 while feedback-controlling the pressure behavior in the mold 10. Uniformly pressing in the stacking direction improves the resin impregnation and the quality of the tank surface.

In this embodiment, after the upper and lower molds are filled with the resin 3, the upper mold 12 and the lower core 13 are closed at the same time for compressive filling while detecting the pressures on the upper face and the lower face of the tank with the pressure sensors 18 and 17, respectively, to keep their pressures the same. This is to keep the pouring pressure at the upper face and the lower face of the tank uniform and reduce (distribute) the pressure. This achieves pressure reduction and uniform impregnation with the resin, and so improves the resin impregnation, the tank performance and the quality of the tank surface.

This enables uniform pressure applied to the entire tank. This also improves the resin impregnation in the stacking direction while optimizing the flow behavior in the mold 10. It is also possible to impregnate there with the resin 3 while feedback-controlling the pressure behavior in the mold 10. Uniformly pressing in the stacking direction improves the resin impregnation and the quality of the tank surface.

In this way, the present embodiment allows impregnation with epoxy resin by the RTM impregnation technique so as to keep the impregnation uniform in the stacking direction (thickness direction) over the entire tank while applying a lower pressure, and so improves the performance of the high-pressure tank and stabilizes the quality of the tank. The present embodiment also enables high-speed filling, and so shortens the molding cycle greatly.

In this way, the present embodiment lowers the lower core 13 as the moving core in the lower mold (first mold) 11 (away from the preform 2) to let the resin 3 flow toward the lower mold (first mold) 11. This distributes the pressure concentrated in the vicinity of the resin inlet 14 and prevents deformation of the preform 2.

The present embodiment lowers the lower core 13 as the moving core in the lower mold (first mold) 11 (separates the lower core away from the preform 2) based on the pressure of the resin 3 between the upper mold (second mold) 12 and the preform 2, and so enables uniform impregnation with the resin 3 over the entire preform 2.

The present embodiment also raises the lower core 13 as the moving core in the lower mold (first mold) 11 (brings the lower core close to the preform 2) so that the pressure of the resin 3 between the lower mold (first mold) 11 and the preform 2 agrees with the pressure of the resin 3 between the upper mold (second mold) 12 and the preform 2. This enables the pressure uniformly applied to the entire preform 2, and so enables uniform impregnation with the resin 3 over the entire preform 2.

That is a detailed description of the embodiments of the present disclosure referring to the drawings. The specific configuration of the present disclosure is not limited to the above-stated embodiment, and the design may be modified variously without departing from the spirits of the present disclosure. The present disclosure covers such modified embodiments.

DESCRIPTION OF SYMBOLS

1 Manufacturing device of high-pressure tank (fiber reinforced resin molded article)
2 Preform
3 Resin
4 High-pressure tank (fiber reinforced resin molded article)
10 Mold
11 Lower mold (first mold)

12 Upper mold (second mold)
13 Lower core (moving core)
14 Gate (resin inlet)
15 Vacuum degassing pipe (vacuum degassing mechanism)
16 Resin pouring pipe (resin pouring mechanism)
17 Pressure sensor (first pressure sensor)
18 Pressure sensor (second pressure sensor)
20 Transfer mechanism
25 Shaft
30 Driving mechanism
40 Temperature controller
50 Vacuum pump (vacuum degassing mechanism)
60 Resin injector (resin pouring mechanism)
61, 66 Resin storage
62, 67 Resin reservoir
63, 68 Pressure device
65 Valve
90 Control device

What is claimed is:

1. A method for manufacturing a fiber reinforced resin molded article, the method including forming a preform including a fiber layer on an outer surface of a liner, impregnating the fiber layer of the preform with resin, and curing the resin, comprising:
    a step of preparing a mold including a first mold and a second mold;
    a step of placing the preform between the first mold and the second mold so as to define a first gap between the first mold and the preform and a second gap between the second mold and the preform, the second gap being larger than the first gap;
    a step of pouring the resin from a resin inlet toward the second gap in the mold;
    a step of separating at least a part of the first mold facing the preform from the preform to define a third gap between the at least a part of the first mold and the preform, the third gap being larger than the first gap, to charge the resin, which was poured toward the second gap in the mold, into a space between the first mold and the preform; and
    a step of bringing the second mold and the at least a part of the first mold together toward the preform for compressive filling with the resin in the mold.

2. A method for manufacturing a fiber reinforced resin molded article, the method including forming a preform including a fiber layer on an outer surface of a liner, impregnating the fiber layer of the preform with resin, and curing the resin, comprising:
    a step of preparing a mold including a first mold and a second mold, the first mold having a moving core that is disposed to face the preform and moves relative to the preform so as to increase and decrease a gap defined between the moving core and the preform;
    a step of placing the preform between the first mold and the second mold so as to define a first gap between the first mold and the preform and a second gap between the second mold and the preform, the second gap being larger than the first gap;
    a step of pouring the resin from a resin inlet toward the second gap in the mold;
    a step of separating the moving core from the preform to define a third gap between the moving core and the preform, the third gap being larger than the first gap, to charge the resin, which was poured toward the second gap in the mold, into a space between the first mold and the preform; and
    a step of bringing the second mold and the moving core together toward the preform for compressive filling with the resin in the mold.

3. The method for manufacturing a fiber reinforced resin molded article according to claim 2, wherein
    in the step of separating the moving core from the preform to charge the resin, which was poured toward the second gap in the mold, into the space between the first mold and the preform, the second mold is brought toward the preform.

4. The method for manufacturing a fiber reinforced resin molded article according to claim 2, wherein
    in the step of separating the moving core from the preform to charge the resin, which was poured toward the second gap in the mold, into the space between the first mold and the preform, the moving core is separated from the preform while detecting a pressure of the resin poured between the second mold and the preform.

5. The method for manufacturing a fiber reinforced resin molded article according to claim 2, wherein
    in the step of bringing the second mold and the moving core together toward the preform for compressive filling with the resin in the mold, the second mold and the moving core are brought together to the preform so that a pressure of the resin poured between the moving core and the preform agrees with a pressure of the resin poured between the second mold and the preform.

* * * * *